United States Patent
Twede (10) Patent No.: US 11,042,739 B2
(45) Date of Patent: Jun. 22, 2021

(54) POLARIZATION-BASED IRIS IDENTIFICATION

(71) Applicant: Lockheed Martin Corporation, Bethesda, MD (US)

(72) Inventor: David R. Twede, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 13 days.

(21) Appl. No.: 16/489,732

(22) PCT Filed: Mar. 5, 2018

(86) PCT No.: PCT/US2018/020906
§ 371 (c)(1),
(2) Date: Aug. 29, 2019

(87) PCT Pub. No.: WO2018/161076
PCT Pub. Date: Sep. 7, 2018

(65) Prior Publication Data
US 2019/0384974 A1    Dec. 19, 2019

Related U.S. Application Data

(60) Provisional application No. 62/466,530, filed on Mar. 3, 2017.

(51) Int. Cl.
*G06K 9/00* (2006.01)
*G06F 21/32* (2013.01)

(52) U.S. Cl.
CPC ........ *G06K 9/00604* (2013.01); *G06F 21/32* (2013.01); *G06K 9/00617* (2013.01)

(58) Field of Classification Search
CPC . G06K 9/00604; G06K 9/00617; G06F 21/32
See application file for complete search history.

(56) References Cited

U.S. PATENT DOCUMENTS

| | | | |
|---|---|---|---|
| 2004/0170304 A1* | 9/2004 | Haven | A61B 5/163 382/115 |
| 2006/0088193 A1* | 4/2006 | Muller | G06K 9/00597 382/117 |
| 2008/0002863 A1* | 1/2008 | Northcott | A61B 3/1216 382/117 |
| 2011/0058038 A1 | 3/2011 | Twede | |
| 2016/0253559 A1* | 9/2016 | Goncharov | G02B 17/086 348/78 |

OTHER PUBLICATIONS

Grother, P. et al., "Biometric Specifications for Personal Identity Verification," NIST Special Publication 800-76-2, Jul. 2013, 61 pages.

(Continued)

*Primary Examiner* — Edward Park
(74) *Attorney, Agent, or Firm* — Withrow & Terranova, PLLC (57) ABSTRACT

The embodiments implement fraud-resistant biometric security based on polarization-based iris identification. The embodiments include identifying an iris based on unique patterns of polarized electromagnetic radiation (EMR) received from the iris.

17 Claims, 9 Drawing Sheets

(56) References Cited

OTHER PUBLICATIONS

NIST, "Video-based Automatic System for Iris Recognition (VASIR)," Nov. 15, 2019, available at https://www.nist.gov/services-resources/software/video-based-automatic-system-irisrecognition-vasir, 5 pages.
International Search Report and Written Opinion for International Patent Application No. PCT/US2018/020906, dated Jun. 14, 2018, 13 pages.
International Preliminary Report on Patentability for International Patent Application No. PCT/US2018/020906, dated Sep. 12, 2019, 10 pages.

\* cited by examiner

POLARIZATION-BASED IRIS IDENTIFICATION

RELATED APPLICATIONS

This application is a 35 U.S.C. § 371 national phase filing of International Application No. PCT/US18/20906, filed Mar. 5, 2018, entitled "POLARIZATION-BASED IRIS IDENTIFICATION," which claims the benefit of U.S. Provisional Patent Application No. 62/466,530, filed on Mar. 3, 2017, entitled "POLARIZATION-BASED IRIS IDENTIFICATION," the disclosures of each of which are hereby incorporated herein by reference in their entireties.

TECHNICAL FIELD

The embodiments relate generally to verifying identity, and, in particular, to polarization based iris authentication and/or identification.

BACKGROUND

There is a large demand for improved biometric systems that are inexpensive, easy to use, reliable, and highly secure for purposes of verifying identification. As secure applications, such as banking and investment applications, are implemented on mobile devices, the need to confirm identity without being spoofed becomes increasingly important. Conventional biometrics that can be countered and spoofed, such as facial recognition, fingerprint scanners, and conventional iris scanners, does not sufficiently protect the use of such applications.

Passwords are an industry standard. However, passwords can, and often are, hacked. Additionally, as the complexity requirements for passwords increase, such as a requirement for a particular length of password, combination of upper and lowercase characters, digits, and special characters, the ease of use decreases significantly. Accordingly, there is a need for simple but fraud-resistant biometric systems.

SUMMARY

The embodiments implement fraud-resistant biometric security based on polarization-based iris authentication and/or identification. The embodiments identify an iris based on unique patterns of polarized electromagnetic radiation (EMR) received from the iris.

In one embodiment a method is disclosed. The method includes receiving, by at least one sensor apparatus, polarized EMR in a first waveband from an iris of an eye and polarized EMR in a second waveband from the iris, the polarized EMR in the first waveband having a first polarization orientation and the polarized EMR in the second waveband having a second polarization orientation. The method further includes generating, by a computing device, an iris pattern based on the polarized EMR in the first waveband and the polarized EMR in the second waveband. The method further includes comparing the iris pattern to a reference iris pattern that was generated based on the iris. The method further includes generating a match signal or a mismatch signal based on comparing the iris pattern to the reference iris pattern.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first polarizing filter" and "second polarizing filter," and does not imply a priority, a type, an importance, or other attribute, unless otherwise stated herein. The term "about" used herein in conjunction with a numeric value means any value that is within a range of ten percent greater than or ten percent less than the numeric value.

The phrase "unpolarized EMR" as used herein refers to EMR that contains photons with a random distribution of electric field orientations, also called polarization. Examples of unpolarized EMR is EMR generated by the sun, flames, and incandescent lamps. Polarized EMR refers to a plurality of EMR rays (i.e., photons) that has the same polarization orientation, whether linear or circular. Partially polarized EMR refers to EMR that has an unpolarized EMR component and a polarized EMR component.

An iris includes pigmented cells and multiple muscle layers. The pigmented cells have detectable spectral property differences in a range of wavelengths, including ultraviolet, visible, and infrared (IR) wavelengths, and the muscle layers cause distinct polarization signatures that vary uniquely for each individual based on striation patterns that form during eye development in early life, and which can sometimes change later in life (often due to pathology). Some embodiments utilize a filter assembly that includes multiple polarization state filters (e.g., polarizing filters) that filter EMR received (emitted or reflected) from an iris based on a polarization orientation (i.e., state) of the EMR. A sensor apparatus downstream of the filter assembly receives the filtered EMR from the filter assembly, and outputs sensor data that quantifies the spatial locations and, in some embodiments, wavebands and/or degrees of polarization of the filtered EMR. A computing device receives the sensor data and generates a unique iris pattern based on the sensor data. Printed photographs or displayed images of an iris recording will not generate the identical polarization states and/or the combination of visible through near-infrared wavebands that are inherent from the biology of the iris, and thus cannot be used to spoof the system. In some embodiments, the system includes a thermal sensor which may be used to confirm that a warm human eye is in proximity to the system. In some embodiments, the system includes a blink monitor and requires the user to blink to ensure a non-static human iris is being viewed. In some embodiments, the system includes a fingerprint scanner and/or facial recognition.

The embodiments may be implemented in any of a number of different devices. In some embodiments, the disclosed system is implemented in a smart phone. The system may be added to an existing smart phone, or may be integrated by a manufacturer into a smart phone product relatively inexpensively. The system may be used for any type of authentication and/or identification purpose, such as, by way of non-limiting examples, an authentication system that allows or denies access to an application on a smart phone; an authentication system that allows or denies access to an application on a computing device that is communicatively coupled to the smart phone; or an authentication system that actuates a physical lock that is communicatively coupled to the smart phone, such as a lock to a bank safe, or a door.

Figure 1:
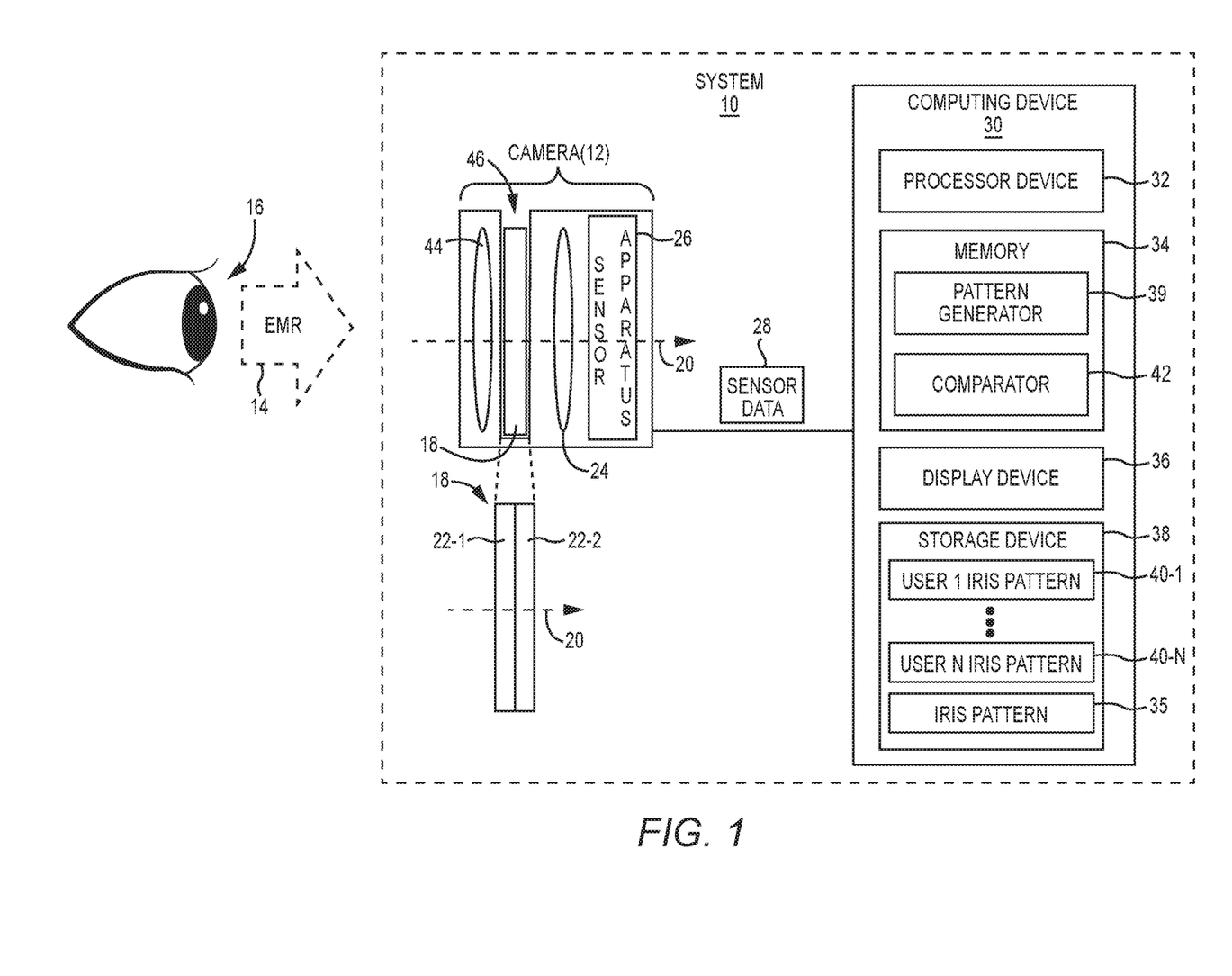
FIG. 1 is a block diagram of a system according to one embodiment.

FIG. 1 is a block diagram of a system 10 according to one embodiment. The system 10 includes a camera 12 that receives EMR 14 from an iris 16 of an eye. The EMR 14 may comprise EMR in any waveband, including, by way of non-limiting example, a visible waveband in a visible light spectrum ranging from about 380 nanometers (nm) to about 700 nm, and a near-infrared (NIR) waveband in an infrared spectrum ranging from about 700 nm to about 1400 nm. As used herein, the term "iris" or "iris 16" may include the iris and areas adjacent to the iris, such as the sclera, the pupil, the boundary between the iris and the sclera, the eyelids, and the boundaries between the sclera and the upper and lower eyelids. The EMR 14 may be reflected off of the iris 16 and/or emitted by the iris 16. The EMR 14 that is reflected off of or emitted by the iris 16 may be partially polarized for the reasons discussed above. The phrase "waveband" includes a range of wavelengths within the relevant spectrum, such as within the visible light spectrum, the ultraviolet light spectrum, or the NIR spectrum.

The system 10 includes a filter assembly 18 that is positioned in the camera 12 in an optical path 20 along which the EMR 14 travels. In one embodiment, the filter assembly 18 includes a first polarizing filter 22-1 positioned in the optical path 20 that is configured to receive the EMR 14 from the iris 16 and to pass a first subset of EMR 14 comprising EMR 14 in a first waveband that has a first polarization orientation and EMR 14 in a second waveband irrespective of polarization orientation. The first polarizing filter 22-1 blocks the EMR 14 in the first waveband that does not have the first polarization orientation. The first polarizing filter 22-1 may also pass the EMR 14 in a number of other wavebands irrespective of polarization orientation. As an example, the first waveband may include a blue waveband of the EMR 14 comprising the EMR 14 having a wavelength in a range between about 450 nm and 495 nm (referred to herein as "blue EMR 14" for the sake of brevity), and the EMR 14 in the second waveband may include a red waveband comprising the EMR 14 having a wavelength in a range between about 625 nm and 675 nm (referred to herein as "red EMR 14" for the sake of brevity). The first polarization orientation may include, for example, a vertical polarization orientation. Thus, in this example, the first polarizing filter 22-1 passes the blue EMR 14 that has a vertical polarization orientation and blocks the blue EMR 14 that has a polarization other than the vertical polarization orientation. The first polarizing filter 22-1 also passes the red EMR 14 irrespective of polarization orientation, and optionally, for example, green and/or NIR EMR 14 irrespective of polarization orientation.

The filter assembly 18 includes a second polarizing filter 22-2 positioned in the optical path 20 downstream of the first polarizing filter 22-1. The second polarizing filter 22-2 is configured to receive the first subset of the EMR 14 from the first polarizing filter 22-1 and to pass a second subset of the EMR 14 including the EMR 14 in the second waveband that has a second polarization orientation and the EMR 14 in the first waveband that has the first polarization orientation. The second polarizing filter 22-2 blocks the EMR 14 in the second waveband that does not have the second polarization orientation. In this example, the second polarization orientation may comprise a horizontal orientation that is orthogonal to the first polarization orientation, and thus, the second polarizing filter 22-2 passes the red EMR 14 that has a horizontal polarization orientation and blocks the red EMR 14 having a polarization other than the horizontal polarization orientation. The second polarizing filter 22-2 also passes the blue EMR 14 irrespective of polarization orientation. The second polarizing filter 22-2 may also optionally pass other EMR 14, such as green and/or NIR EMR 14, irrespective of polarization orientation.

The first polarizing filter 22-1 and the second polarizing filter 22-2 may be referred to generally herein singularly as "polarizing filter 22" or in the plural as "polarizing filters 22." The phrase "pass" as used herein in conjunction with the polarizing filter 22 refers to the emission by the polarizing filter 22 of the EMR 14 that has passed through the polarizing filter 22, and does not imply active electronics that actively transmit the EMR 14.

The second subset of the EMR 14 thus, in this example, comprises vertically polarized blue EMR 14, horizontally polarized red EMR 14, and may also include other wavebands of any polarization orientation. The second subset of the EMR 14 may pass through one or more lens arrangements 24 and then impinge upon a sensor apparatus 26 in the camera 12. The sensor apparatus 26 comprises a plurality of detector elements sensitive to the EMR 14 in all desired wavebands, including the EMR 14 in the first waveband and the EMR 14 in the second waveband, which, in this example, are in the visible wavebands of blue EMR 14 and red EMR 14. Thus, in the example of the EMR 14 in the visible light spectrum, the sensor apparatus 26 may comprise, for example, a complimentary metal-oxide semiconductor (CMOS) or a charge-coupled device (CCD) sensor device. In other embodiments, such as embodiments that operate in the infrared (IR) wavebands, the sensor apparatus 26 may comprise either a CMOS or CCD sensor, or a focal plane array (FPA), depending on the particular IR wavebands of interest. The sensor apparatus 26 is also configured to distinguish the EMR 14 in the first waveband from the EMR 14 in the second waveband. For example, the sensor apparatus 26 may include, or may be downstream of, a color filter array such as a Bayer filter mosaic, or other color separating mechanisms, such as spectral dispersive elements, notch filters, bandpass filters, and the like. The sensor apparatus 26 may have any desired resolution, such as a 1024×1024 grid of 1,048,576 detector elements.

The sensor apparatus 26 generates sensor data 28 that characterizes the EMR 14 impinging on the detector elements. The system 10 includes a computing device 30 that has a processor device 32, memory 34, a display device 36, and a storage device 38. The computing device 30 generates an iris pattern 35, which is stored in the storage device 38, based on the sensor data 28 received from the sensor apparatus 26. In one embodiment, a pattern generator 39 in the memory 34 comprises executable instructions that program the processor device 32 to generate the iris pattern 35. The iris pattern 35 may comprise digitized data that identifies features extracted from the sensor data 28. Such features may include one or more of the following:

grayscale image—continuous-tone image of luminance data;

color images—separate grayscale images for each of red, green, blue or near infrared data;

polarization scale images—separate grayscale images for each polarization axis translated to a color;

differential polarization values—the magnitude difference between Polarizations captured;

Modulation transfer function (MTF) of polarization images or differential polarization—the image modulus ratio to the iris object spatial frequency that are due to polarization in each color or orientation;

MTF—ratio of the image modulation to the object modulation as a function of spatial frequency;

spatial frequency—measure of the repetition rate of a sinusoidal intensity pattern in space, in units of cycles/degrees or of cycles/mm at a given target range. This relates to how varied or smooth the iris pattern 35 is;

iris features—in each image the annular structure in the front portion of the eye comprised of muscular and connective tissue and pigmented layers, that defines the pupil and controls its size;

iris center—center of a circle modelling the boundary between iris and sclera;

iris radius—radius of a circle modelling the boundary between iris and sclera;

limbus—outer boundary of the iris where it is joined to the sclera;

margin—distance in image units from the iris-sclera border, when modelled as a circle, to the closest image border (expressed in pixels);

pupil—optical opening in the center of the eye that serves as a variable light aperture and defines the inner boundary of the iris;

pupil center—average of coordinates of all the pixels lying on the boundary of the pupil and the iris;

iris eccentricity—the roundness or eccentricity of the iris;

pupil eccentricity—the roundness or eccentricity of the pupil; and sclera—generally white wall of the eye peripheral to the iris.

The computing device 30 compares the iris pattern 35 to a reference iris pattern 40-1, which is also stored in the storage device 38, which was previously generated based on the iris 16 and the same one or more features used to generate the iris pattern 35. The computing device 30 may determine that the reference iris pattern 40-1 (shown as the "User 1 Iris Pattern 40-1") and the generated iris pattern 35 match and generate a match signal that, for example, allows access to an application, or opens a lock. If the computing device 30 determines that the reference iris pattern 40-1 and the generated iris pattern 35 do not match, the computing device 30 may generate a mismatch signal that, for example, prevents access to the application, or fails to open a lock. In some embodiments, a comparator 42 in the memory 34 performs the comparison to determine if the reference iris pattern 40-1 matches the generated iris pattern 35. In some embodiments, the computing device 30 may also generate a new reference iris pattern 40-1 based on the existing reference iris pattern 40-1 and the newly generated iris pattern 35, to further refine the reference iris pattern 40-1.

The system 10 may also include an objective lens 44 positioned in the camera 12 to receive the EMR 14 from the iris 16. The EMR 14 may travel downstream along the optical path 20 to the filter assembly 18. Note that the filter assembly 18 may be placed at any location along the optical path 20, including at a pupil plane or an image plane. In some embodiments, a number of different filter assemblies 18 may exist, and the filter assemblies 18 may be constructed with a frame that can be detachably inserted into a receiver 46. In this manner, a particular filter assembly 18 that operates in two (or more) desired wavebands with desired polarization orientations may be inserted into the receiver 46, depending on the particular colors of the iris 16.

In some embodiments, the computing device 30 may require the user to blink once or twice. The computing device 30 analyzes the sensor data 28 to determine whether a blink of the eye is detected, to ensure that the iris 16 is that of a human eye rather than a static image. Display technology, such as a liquid crystal display, could be used to provide motion of a human eye blinking, however, since such devices do not convey the polarization patterns of the physiological iris, but rather a single polarization from the display, the filter assembly 18 will filter out that display radiance and the comparator 42 will recognize an artificial display source.

In some embodiments, the first polarizing filter 22-1 is fixed with respect to the second polarizing filter 22-2. In some embodiments, the first polarizing filter 22-1 may be coupled directly to the second polarizing filter 22-2 via an adhesive, as an optical coating, or the like. In other embodiments, the first polarizing filter 22-1 may be movable with respect to the second polarizing filter 22-2. In some embodiments, the polarization orientation of the first polarizing filter 22-1 may be movable with respect to the polarization orientation of the second polarizing filter 22-2. For example, the polarization orientation of the first polarizing filter 22-1 may be movable between a range of 20 degrees to 90 degrees with respect to the polarization orientation of the second polarizing filter 22-2, or within any other desired range. The first polarizing filter 22-1 and the second polarizing filter 22-2 may be sourced from any of a number of optics providers and manufacturers, such as Edmund Optics Inc. located at 101 East Gloucester Pike, Barrington, N.J. 08007-1380; Deposition Sciences, Inc. located at 3300 Coffey Lane, Santa Rosa Calif. 95403; or MOXTEK, Inc. located at 452 W 1260 N, Orem, Utah 84057.

While for purposes of illustration the polarization orientations are discussed herein as being linear, the embodiments are not limited to linear polarization orientations, and have applicability to circular and elliptical polarization orientations as well. Thus, first polarization orientation may be a right-hand circular polarization orientation and the second polarization orientation may be a left-hand circular polarization orientation.

Also, while the filter assembly 18 is illustrated herein as comprising only a single set of the first polarizing filter 22-1 and the second polarizing filter 22-2, in some embodiments, the filter assembly 18 may be segmented, wherein each segment comprises a different set of a first polarizing filter 22 and a second polarizing filter 22, each different set operating with different wavebands and/or different polarization orientations. In other embodiments, the segments may comprise a single polarizing filter 22, each of which relates to a unique polarization orientation and a unique waveband.

The system 10 may be embodied, by way of non-limiting example, in a smartphone, a computing tablet device, a laptop or desktop computing device, or in conjunction with any device desired to prevent access to a place or thing.

Figure 2:
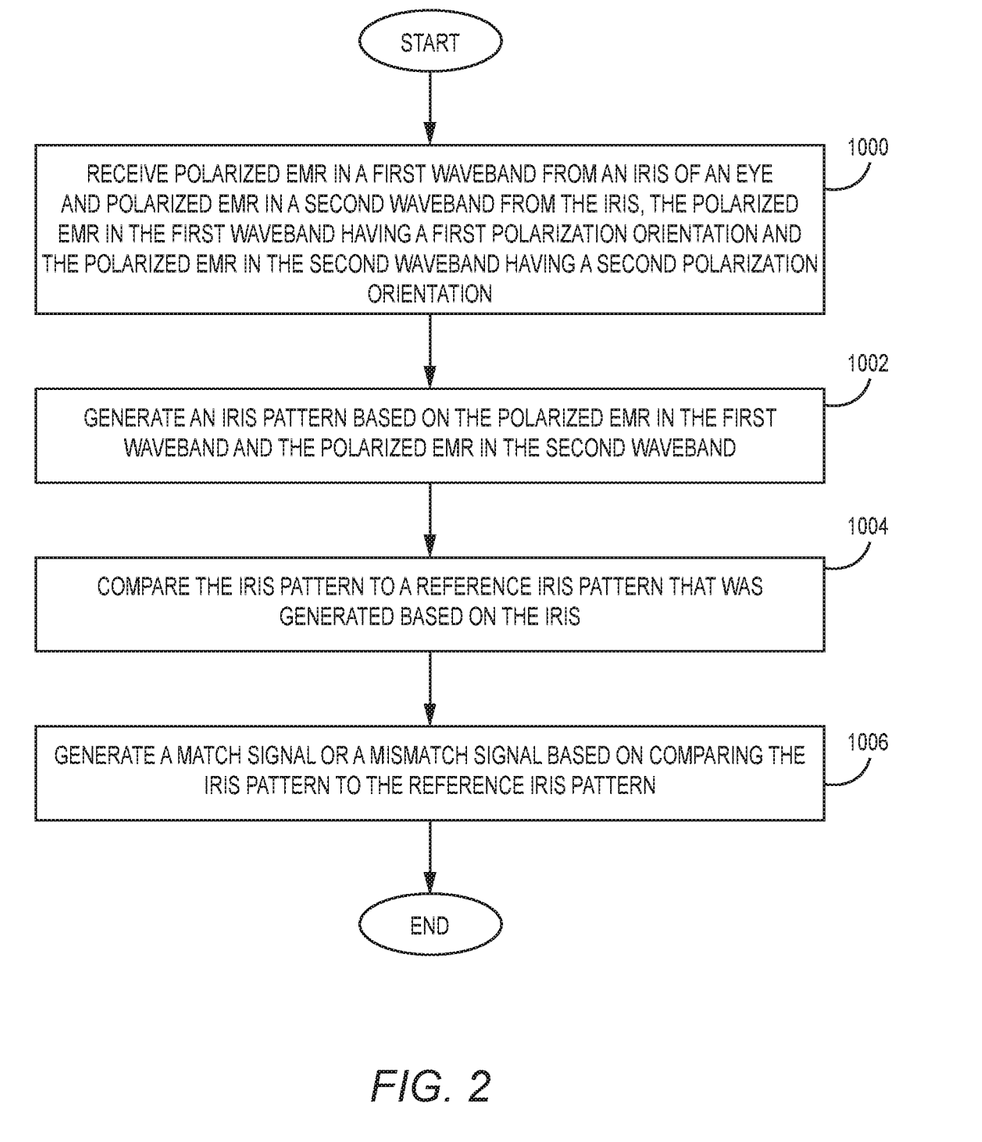
FIG. 2 is a flowchart according to one embodiment.

FIG. 2 is a flowchart of a method for iris identification according to one embodiment. FIG. 2 will be discussed in conjunction with FIG. 1. The sensor apparatus 26 receives the polarized EMR 14 in the first waveband from the iris 16 of the eye and the polarized EMR 14 in the second waveband from the iris 16. The EMR 14 in the first waveband has a first polarization orientation and the EMR 14 in the second waveband has a second polarization orientation (FIG. 2, block 1000). The computing device 30 generates an iris pattern based on the EMR 14 in the first waveband and the EMR 14 in the second waveband (FIG. 2, block 1002). The computing device 30 compares the iris pattern 35 to the reference iris pattern 40-1 that was generated based on the iris 16 (FIG. 2, block 1004). The computing device 30 generates a match signal or a mismatch signal based on comparing the iris pattern 35 to the reference iris pattern 40-1 (FIG. 2, block 1006).

Figure 3:
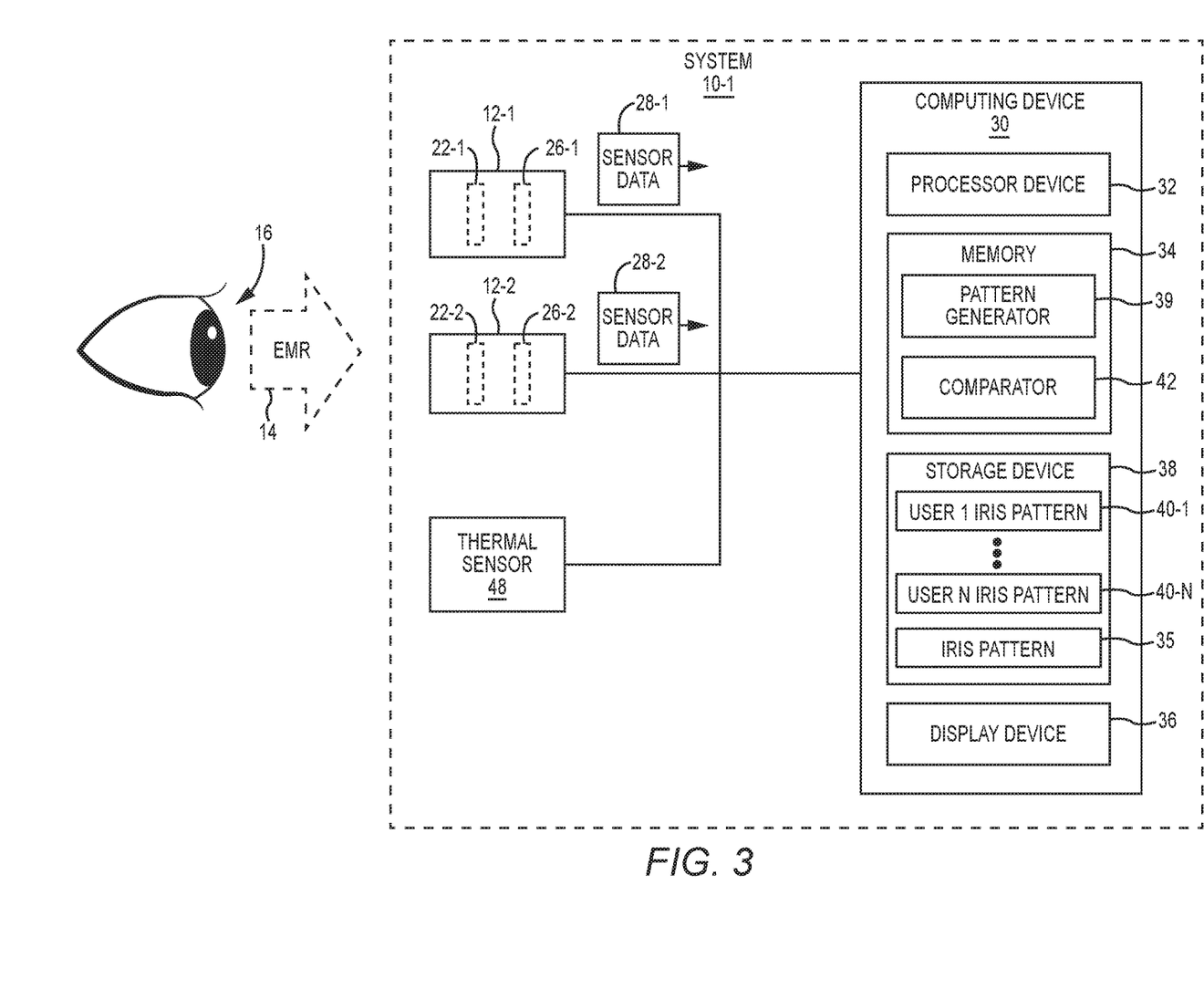
FIG. 3 is a block diagram of a system according to another embodiment.

FIG. 3 is a block diagram of a system 10-1 according to another embodiment. The system 10-1 operates substantially similarly to the system 10 described above with regard to FIG. 1, except as otherwise discussed herein. In this example, the system 10-1 includes two cameras 12-1 and 12-2, which may be co-located in close proximity, or may have sufficient separation to provide unique perspective data on the same iris 16. In one embodiment, the camera 12-1 includes a first polarizing filter 22-1 that is configured to receive the EMR 14 from the iris 16 and to pass a first subset of the EMR 14 comprising the EMR 14 in a first waveband that has a first polarization orientation and to block other EMR 14 in the first waveband. A first sensor apparatus 26-1 in the camera 12-1 receives the EMR 14 in the first waveband that has the first polarization orientation, generates sensor data 28-1 based on the EMR 14, and sends the sensor data 28-1 to the computing device 30 for processing, as discussed above with regard to FIG. 1.

The camera 12-2 includes a second polarizing filter 22-2 that is configured to receive the EMR 14 from the iris 16 and to pass a second subset of the EMR 14 comprising the EMR 14 in a second waveband that has a second polarization orientation and to block other EMR 14 in the second waveband. A second sensor apparatus 26-2 in the camera 12-2 receives the EMR 14 in the second waveband that has the second polarization orientation, generates sensor data 28-2 based on the EMR 14, and sends the sensor data 28-2 to the computing device 30 for processing, as discussed above with regard to FIG. 1.

In one example, the camera 12-1 is a black and white camera without a color filter array. The first polarizing filter 22-1 is configured to receive the EMR 14 from the iris 16 and to pass a first subset of the EMR 14 comprising the EMR 14 in a first waveband that has a first polarization orientation and to block other EMR 14 in the first waveband. The first polarizing filter may pass other EMR 14 in other wavebands irrespective of polarization orientation, or, in other embodiments, may block all other EMR 14 in other wavebands. The camera 12-2 is also a black and white camera without a color filter array. The second polarizing filter 22-2 is configured to receive the EMR 14 from the iris 16 and to pass a second subset of the EMR 14 comprising the EMR 14 in a second waveband that has a second polarization orientation and to block other EMR 14 in the second waveband. The second polarizing filter 22-2 may pass other EMR 14 in other wavebands irrespective of polarization orientation, or, in other embodiments, may block all other EMR 14 in other wavebands. Respective sensor apparatuses 26-1, 26-2 in the cameras 12-1, 12-2 generate sensor data 28-1, 28-2 and provide the sensor data 28-1, 28-2 to the computing device 30 for processing, as discussed above with regard to FIG. 1.

In another example, the camera 12-1 is a color camera and the first polarizing filter 22-1 is a broadband polarizing filter that is configured to receive the EMR 14 from the iris 16 and to pass a first subset of EMR 14 comprising the EMR 14 in a broad waveband that has a first polarization orientation. The camera 12-2 is also a color camera, and the first polarizing filter 22-1 in the camera 12-2 includes a second broadband polarizing filter that is configured to receive the EMR 14 from the iris 16 and to pass a first subset of the EMR 14 comprising the EMR 14 in the same broad waveband, that has a second polarization orientation. Respective sensor apparatuses 26-1, 26-2 in the cameras 12-1, 12-2 generate sensor data 28-1, 28-2 and provide the sensor data 28-1, 28-2 to the computing device 30 for processing, as discussed above with regard to FIG. 1.

In one embodiment, the system 10-1 includes a thermal sensor 48 that may comprise, for example, a single thermal detector element or an array of thermal detector elements. The thermal sensor 48 is configured to detect features such as a temperature of a human user in close proximity of the system 10-1. The thermal sensor 48 can thus prevent attempts to spoof the system 10-1 via the use of photographs or other mechanisms that do not involve the use of a human. In one embodiment, the thermal sensor 48 is a passive IR sensor. In some embodiments the thermal sensor 48 is a micro-bolometer imager and may be used to include content of the iris 16 in the thermal band as part of the iris pattern 35.

While for purposes of illustration only two cameras are illustrated in FIG. 3, the embodiments may utilize any combination of cameras 12 and polarizing filters 22, such as three cameras 12 and three polarizing filters 22, four cameras 12 and four polarizing filters 22, one camera 12 and three polarizing filters 22, two cameras 12 and three polarizing filters 22, and the like. The embodiments may also utilize any combination of wavebands in the visible light spectrum, the ultraviolet light spectrum, or the NIR spectrum, and any combination of polarization orientations.

Figure 4:
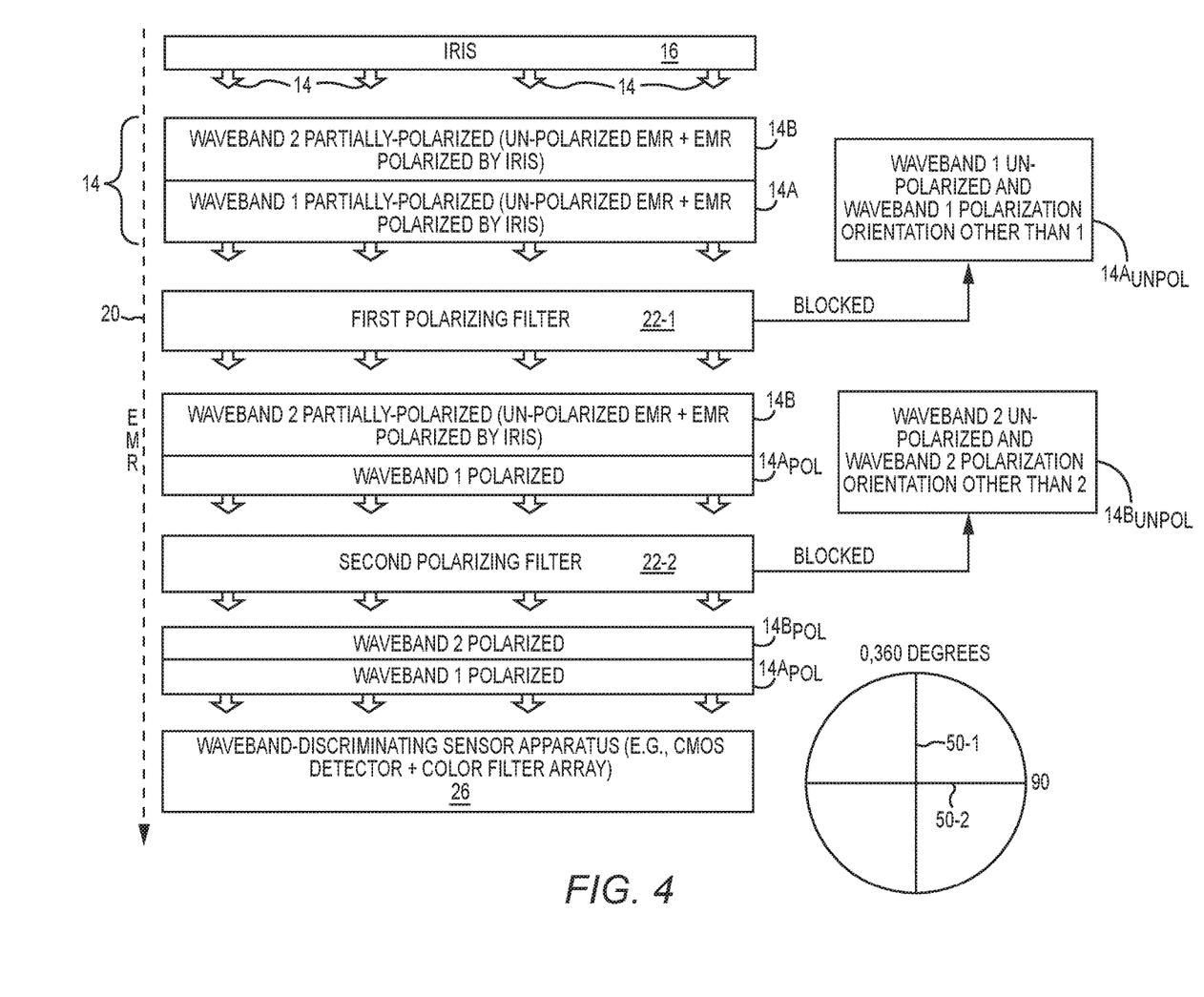
FIG. 4 is a block diagram illustrating filtering aspects of two polarizing filters according to one embodiment.

FIG. 4 is a block diagram illustrating filtering aspects of two polarizing filters 22-1, 22-2 according to one embodiment. The EMR 14 will be described herein as partially polarized, meaning that some of the EMR 14 has been polarized by the iris 16, and some of the EMR 14 is unpolarized. Merely for purposes of illustration, the first polarization orientation will be a zero degree orientation 50-1, and the second polarization orientation will be a ninety degree orientation 50-2. The EMR 14 includes EMR 14A that comprises the EMR 14 in the first waveband, both polarized and unpolarized, EMR 14B that includes the EMR 14 in the second waveband, both polarized and unpolarized, and EMR 14 in other wavebands irrespective of polarization (the latter, not illustrated).

The first polarizing filter 22-1 passes the EMR 14B downstream, and blocks the EMR $14A_{UNPOL}$ comprising the EMR 14 in the first waveband having any polarization orientation other than the first polarization orientation. The first polarizing filter 22-1 passes downstream the EMR $14A_{POL}$ comprising the EMR 14 in the first waveband having the first polarization orientation. The second polarizing filter 22-2 passes the EMR $14A_{POL}$ downstream, and blocks the EMR $14B_{UNPOL}$ comprising the EMR 14 in the second waveband having any polarization orientation other than the second polarization orientation. The second polarizing filter 22-2 passes downstream the EMR $14B_{POL}$ comprising the EMR 14 in the second waveband having the second polarization orientation. The EMR $14A_{POL}$, EMR $14B_{POL}$, and EMR 14 in wavebands other than the first waveband and the second waveband are received by the sensor apparatus 26.

While for purposes of illustration the two polarization orientations have been described as vertical and horizontal, the embodiments are not limited to vertical polarization orientations and horizontal polarization orientations, and may comprise any two polarization orientations that differ from one another by sufficient angles, such as 45 degrees, 60 degrees, or 90 degrees. Additionally, polarization orientations may include circular or elliptical Polarizations and may include any phase angle differences between the orthogonal components of the transverse electromagnetic fields.

Figure 5:
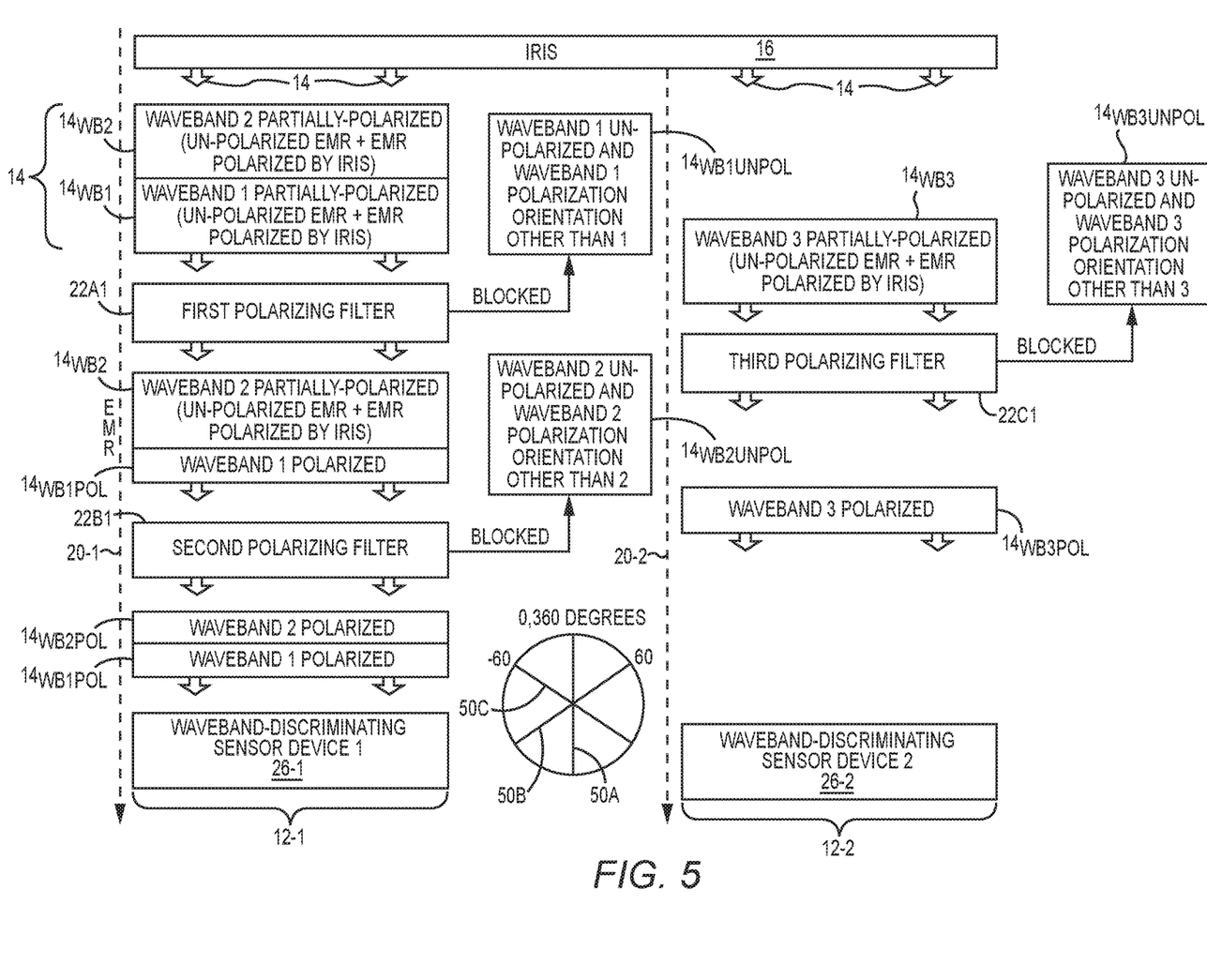
FIG. 5 is a block diagram illustrating filtering aspects of three polarizing filters according to one embodiment.

FIG. 5 is a block diagram illustrating filtering aspects of three polarizing filters 22A1, 22B1, 22C1 according to another embodiment. In this example, two cameras 12-1, 12-2 concurrently receive the EMR 14 from the iris 16. A first camera 12-1 includes an optical path 20-1. A first polarizing filter 22A1 and a second polarizing filter 22B1 are in the optical path 20-1. A sensor apparatus 26-1 receives the EMR 14 after the EMR 14 has passed through the first polarizing filter 22A1 and the second polarizing filter 22B1. The sensor apparatus 26-1 generates sensor data based on the EMR 14 impinging upon the sensor apparatus 26-1.

A second camera 12-2 includes an optical path 20-2. A third polarizing filter 22C1 is in the optical path 20-2. A sensor apparatus 26-2 receives the EMR 14 after the EMR 14 has passed through the third polarizing filter 22C1. The sensor apparatus 26-2 generates sensor data based on the EMR 14 impinging upon the sensor apparatus 26-2.

The computing device 30 (shown in FIG. 1) generates the iris pattern 35 based on the sensor data received from the sensor apparatus 26-1 and the sensor apparatus 26-2.

In this example the first polarizing filter 22A1 receives the EMR 14, which includes the EMR $14_{WB1}$ in a first waveband, EMR $14_{WB2}$ in a second waveband, and EMR 14 in other wavebands (not illustrated), including EMR $14_{WB3}$ in a third waveband (not illustrated). The first polarizing filter 22A1 passes the EMR $14_{WB2}$ downstream, and blocks the EMR $14_{WB1UNPOL}$ comprising the EMR 14 in the first waveband having any polarization orientation other than a first polarization orientation 50A, which in this example, is a 0 degree linear polarization orientation. The first polarizing filter 22A1 passes downstream EMR $14_{WB1POL}$ comprising the EMR 14 in the first waveband having the first polarization orientation 50A.

The second polarizing filter 22B1 passes the EMR $14_{WB1POL}$ downstream, and blocks the EMR $14_{WB2UNPOL}$ comprising the EMR 14 in the second waveband having any polarization orientation other than a second polarization orientation 50B, which in this example, is a 60 degree linear polarization orientation. The second polarizing filter 22B1 passes downstream EMR $14_{WB2POL}$ comprising the EMR 14 in the second waveband having the second polarization orientation 50B. The EMR $14_{WB1POL}$, EMR $14_{WB2POL}$, and EMR 14 in wavebands other than the first waveband and the second waveband are received by the sensor apparatus 26-1, which generates sensor data based on the received EMR 14.

Concurrently, the third polarizing filter 22C1 receives the EMR 14, which includes EMR $14_{WB1}$ in the first waveband, EMR $14_{WB2}$ in the second waveband, and EMR 14 in other wavebands (not illustrated), including EMR $14_{WB3}$ in the third waveband. The third polarizing filter 22C1 blocks EMR $14_{WB3}$UNPOL comprising the EMR 14 in the third waveband having any polarization orientation other than a third polarization orientation 50C, which in this example, is a −60 degree linear polarization orientation. The third polarizing filter 22C1 passes downstream EMR $14_{WB3POL}$ comprising the EMR 14 in the third waveband having the third polarization orientation 50C, as well as the EMR 14 in other wavebands. The EMR $14_{WB3POL}$ and EMR 14 in wavebands other than the third waveband are received by the sensor apparatus 26-2, which generates sensor data based on the received EMR 14.

In one embodiment, the sensor apparatus 26-1 comprises a CMOS or CCD sensor device, and the first and second wavebands are visible light wavebands. The sensor apparatus 26-2 comprises a focal plane array (FPA) and the third waveband is a NIR waveband.

In another embodiment, the sensor apparatus 26-1 comprises a FPA, and the first and second wavebands are two different NIR wavebands. The sensor apparatus 26-2 comprises a CMOS or CCD sensor device and the third waveband is a visible light waveband.

In another embodiment, the sensor apparatus 26-1 and the sensor apparatus 26-2 comprise CMOS or CCD sensor devices and the first, second and third wavebands are each different visible light wavebands.

In another embodiment, the sensor apparatus 26-1 and the sensor apparatus 26-2 comprise FPAs, and the first, second and third wavebands are each different NIR wavebands.

Figure 6:
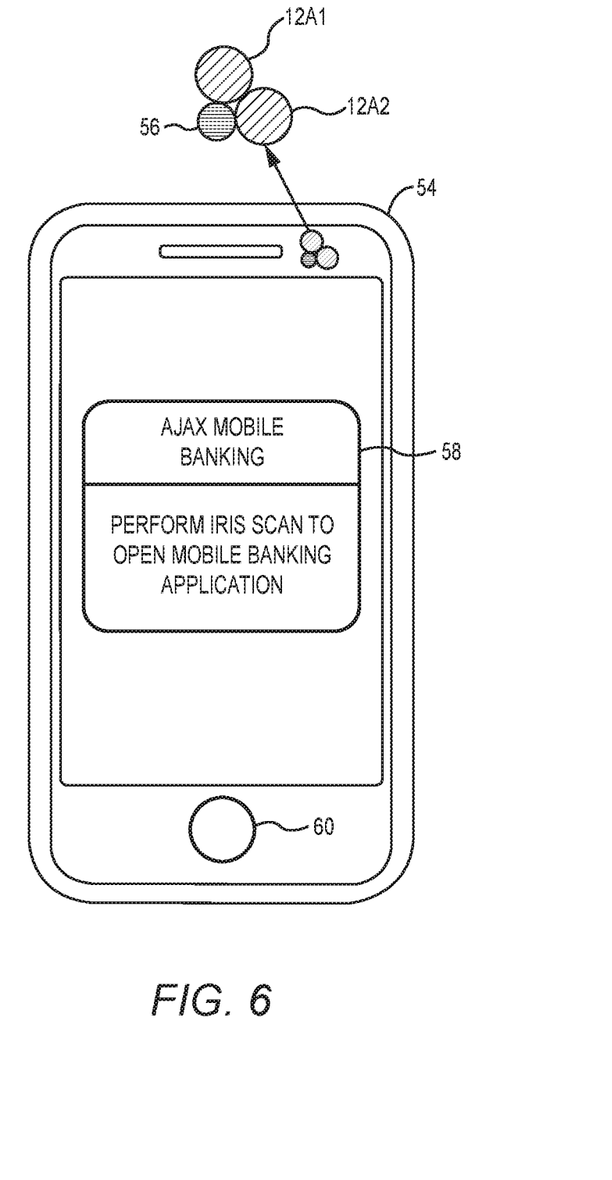
FIG. 6 is a diagram of a computing device according to one embodiment.

FIG. 6 is a diagram of a computing device 54 according to one embodiment. The computing device 54 is a smart phone, and is substantially similar to the computing device 30 as shown in FIG. 1, except as otherwise discussed herein. The computing device 54 includes a camera 12A1 that includes a sensor apparatus 26-1 (not illustrated), and a polarizing filter 22-1 (not illustrated) that is configured to receive the EMR 14 from the iris 16 and to block the EMR 14 in a first waveband having a polarization orientation other than a first polarization orientation. The polarizing filter 22-1 is further configured to pass the EMR 14 in the first waveband that has the first polarization orientation, as well as the EMR 14 in a second waveband irrespective of polarization orientation. The computing device 54 also includes a camera 12A2 that includes a sensor apparatus 26-2 (not illustrated), and a polarizing filter 22-2 (not illustrated) that is configured to receive the EMR 14 from the iris 16 and to block the EMR 14 in a second waveband having a polarization orientation other than a second polarization orientation. The polarizing filter 22-2 is further configured to pass the EMR 14 in the second waveband that has the second polarization orientation, as well as the EMR 14 in the first waveband irrespective of polarization orientation. The computing device 54 also includes a thermal sensor 56 that is configured to detect heat from a human when in proximity to a human.

As an example, assume that a user attempts to initiate an Ajax Mobile Banking application on the computing device 54. The computing device 54 presents a message 58 that indicates that the user must first perform an iris scan before the user will be granted access to the Ajax Mobile Banking application. The user may then orient the computing device 54 such that the iris 16 of the user is facing the cameras 12A1, 12A2 and the thermal sensor 56. The computing device 54 receives from the cameras 12A1, 12A2 polarized EMR 14 in the first waveband from the iris 16 of the eye and polarized EMR 14 in the second waveband from the iris 16, the polarized EMR 14 in the first waveband having a first polarization orientation and the polarized EMR 14 in the second waveband having a second polarization orientation. The computing device 54 generates an iris pattern 35 based on the EMR 14 in the first waveband and the EMR 14 in the second waveband, compares the iris pattern 35 to a reference iris pattern 40-1 previously generated based on the iris 16, and generates a match signal or a mismatch signal based on comparing the iris pattern 35 to the reference iris pattern 40-1. The reference iris pattern 40-1 may be stored on the computing device 54 or stored remotely and may be accessed via a network (not illustrated). The reference iris pattern 40-1 may be encrypted for security purposes, and decrypted by the computing device 54 prior to comparing the iris pattern 35 to the reference iris pattern 40-1.

If the iris pattern 35 matches the reference iris pattern 40-1, the computing device 54 generates a match signal, and the user is given access to the Ajax Mobile Banking application. If the iris pattern 35 does not match the reference iris pattern 40-1, the computing device 54 generates a mismatch signal, and the user is denied access to the Ajax Mobile Banking application.

In one embodiment, the computing device 54 includes a home button 60 that is configured to identify a fingerprint of the user, and the computing device 54 performs both an iris match as well as a fingerprint match. The computing device 54 may also utilize the thermal sensor 56 to detect whether a human is in proximity of the thermal sensor 56 to ensure that the iris 16 is that of a human. The computing device 54 may also require the human to blink.

Figure 7:
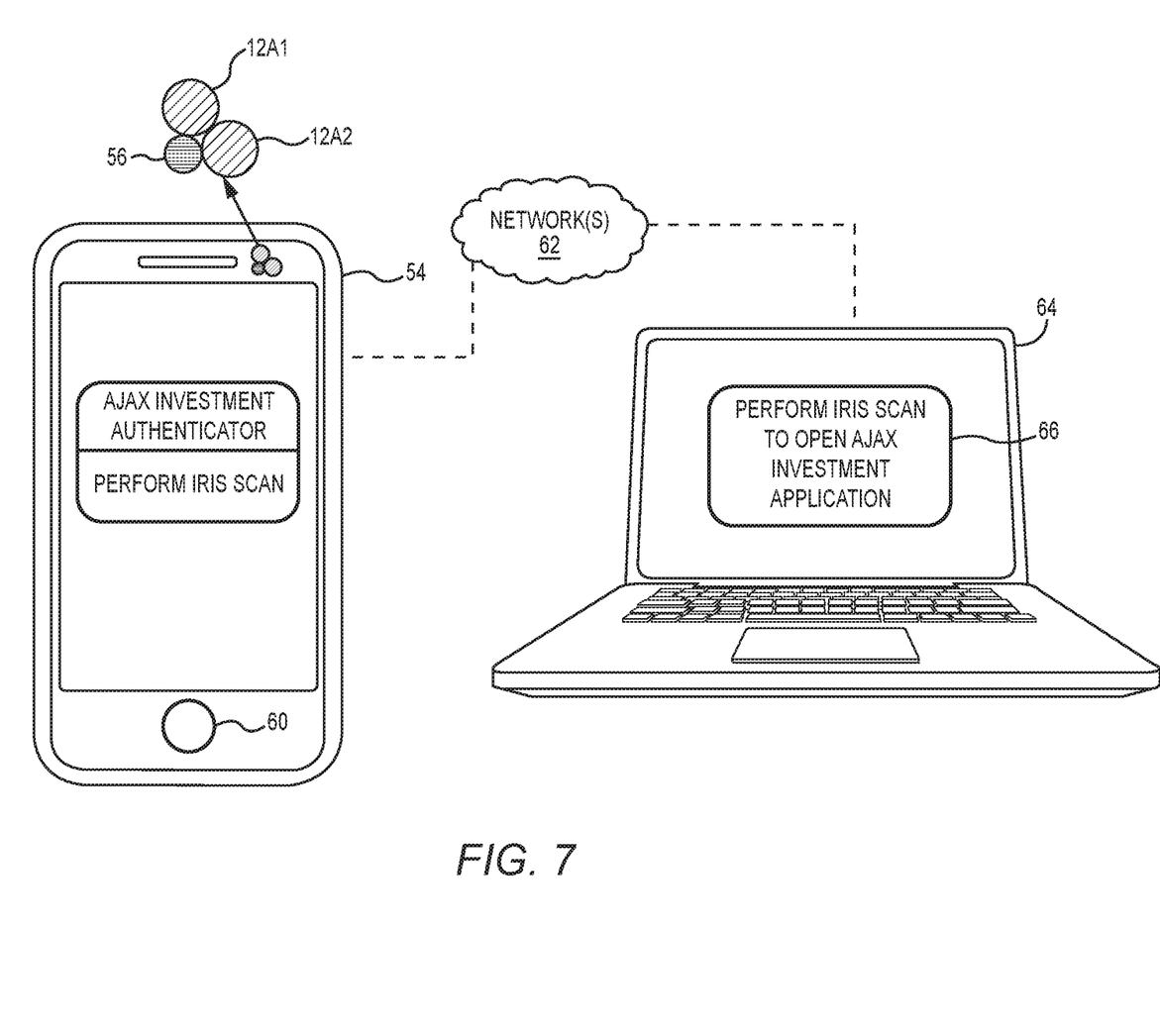
FIG. 7 is a diagram of the computing device illustrated in FIG. 6 according to another embodiment.

FIG. 7 is a diagram of the computing device 54 illustrated in FIG. 6 according to another embodiment. In this embodiment, the computing device 54 is communicatively coupled to a network, or networks, 62. The user of the computing device 54 has access to a computing device 64, which is also communicatively coupled to the network 62, and can thus communicate with the computing device 54. The user initiates an Ajax investment application on the computing device 64. The computing device 64 presents a message 66 that indicates that the user must first perform an iris scan before the user will be granted access to the Ajax investment application. The user may then orient the computing device 54 such that the iris 16 of the user is facing the cameras 12A1, 12A2 and the thermal sensor 56. The computing device 54 receives from the cameras 12A1, 12A2 polarized EMR 14 in the first waveband from the iris 16 of the eye and polarized EMR 14 in the second waveband from the iris 16, the polarized EMR 14 in the first waveband having a first polarization orientation and the polarized EMR 14 in the second waveband having a second polarization orientation. The computing device 54 generates an iris pattern 35 based on the EMR 14 in the first waveband and the EMR 14 in the second waveband, compares the iris pattern 35 to a reference iris pattern 40-1 previously generated based on the iris 16, and generates a match signal or a mismatch signal based on comparing the iris pattern 35 to the reference iris pattern 40-1. The reference iris pattern 40-1 may be stored on the computing device 54 or stored remotely and obtained from the network 62.

If the iris pattern 35 matches the reference iris pattern 40-1, the computing device 54 generates a match signal, and transmits the match signal to the computing device 64 via the network 62. The computing device 64 then initiates the Ajax investment application. If the iris pattern 35 does not match the reference iris pattern 40-1, the computing device 54 generates a mismatch signal, and transmits the mismatch signal to the computing device 64. The computing device 64 denies the user access to the Ajax investment application.

Figure 8:
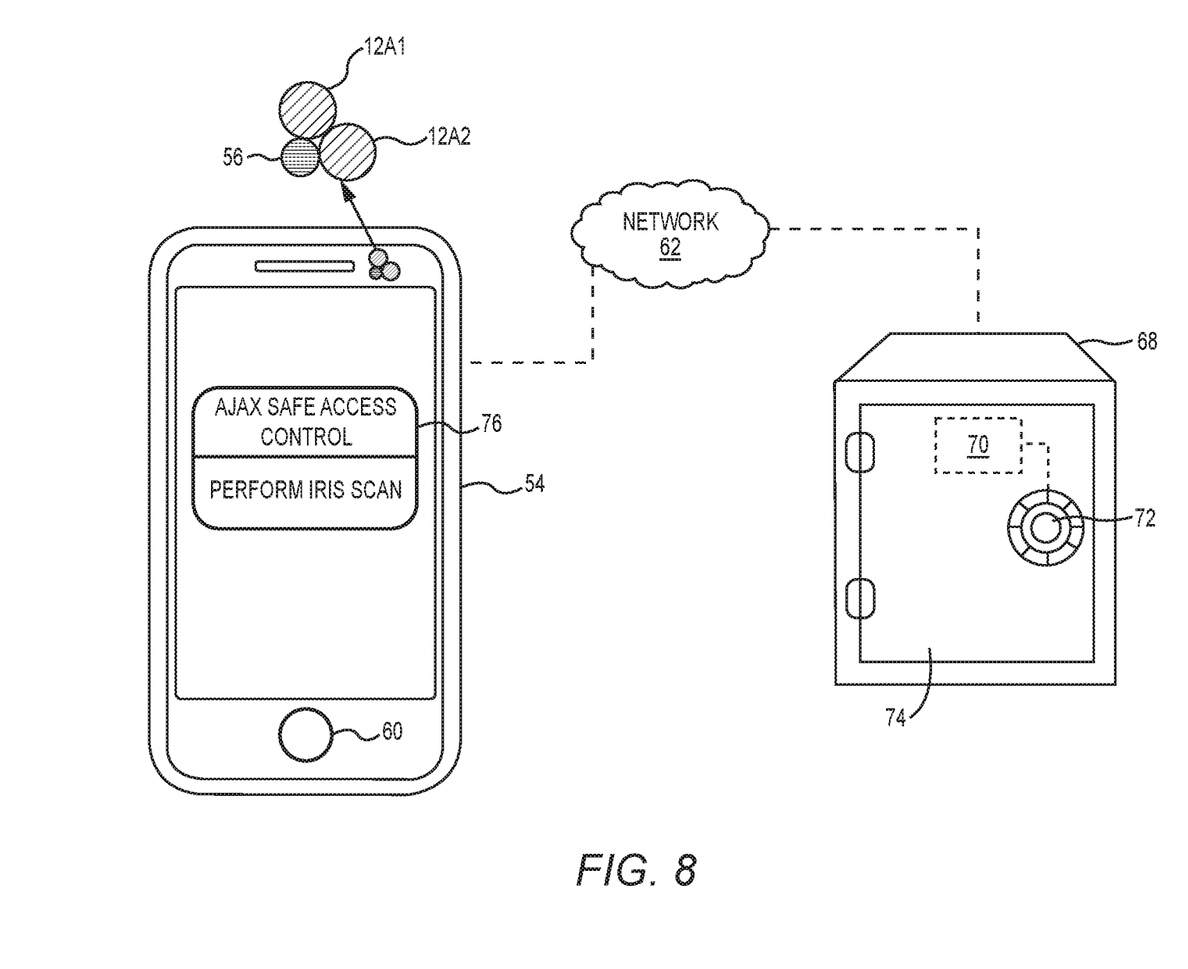
FIG. 8 is a diagram of the computing device illustrated in FIG. 6 according to yet another embodiment.

FIG. 8 is a diagram of the computing device 54 illustrated in FIG. 6 according to another embodiment. In this embodiment, the computing device 54 is communicatively coupled to the network 62. The user of the computing device 54 has access to a safe 68, which includes a computing device 70 that is also communicatively coupled to the network 62, and can thus communicate with the computing device 54. The computing device 70 is also communicatively coupled to a lock 72 that locks or unlocks a door 74 of the safe 68.

The user touches the lock 72 on the safe 68. In response, the computing device 70 sends a message to the computing device 54 to initiate an iris scan. The computing device 54 presents a message 76 that indicates that the user must first perform an iris scan to access the safe 68. The user may then orient the computing device 54 such that the iris 16 of the user is facing the cameras 12A1, 12A2 and the thermal sensor 56. The computing device 54 receives from the cameras 12A1, 12A2 polarized EMR 14 in the first waveband from the iris 16 of the eye and polarized EMR 14 in the second waveband from the iris 16, the polarized EMR 14 in the first waveband having a first polarization orientation and the polarized EMR 14 in the second waveband having a second polarization orientation. The computing device 54 generates an iris pattern 35 based on the EMR 14 in the first waveband and the EMR 14 in the second waveband, compares the iris pattern 35 to a reference iris pattern 40-1 previously generated based on the iris 16, and generates a match signal or a mismatch signal based on comparing the iris pattern 35 to the reference iris pattern 40-1. The reference iris pattern 40-1 may be stored on the computing device 54 or stored in the computing device 70.

If the iris pattern 35 matches the reference iris pattern 40-1, the computing device 54 generates a match signal, and transmits the match signal to the computing device 70. The computing device 70 unlocks the lock 72 and allows the user to open the door 74 of the safe 68. If the iris pattern 35 does not match the reference iris pattern 40-1, the computing device 54 generates a mismatch signal, and transmits the mismatch signal to the computing device 70. The computing device 70 does not unlock the lock 72, denying the user access to the contents of the safe 68.

Figure 9:
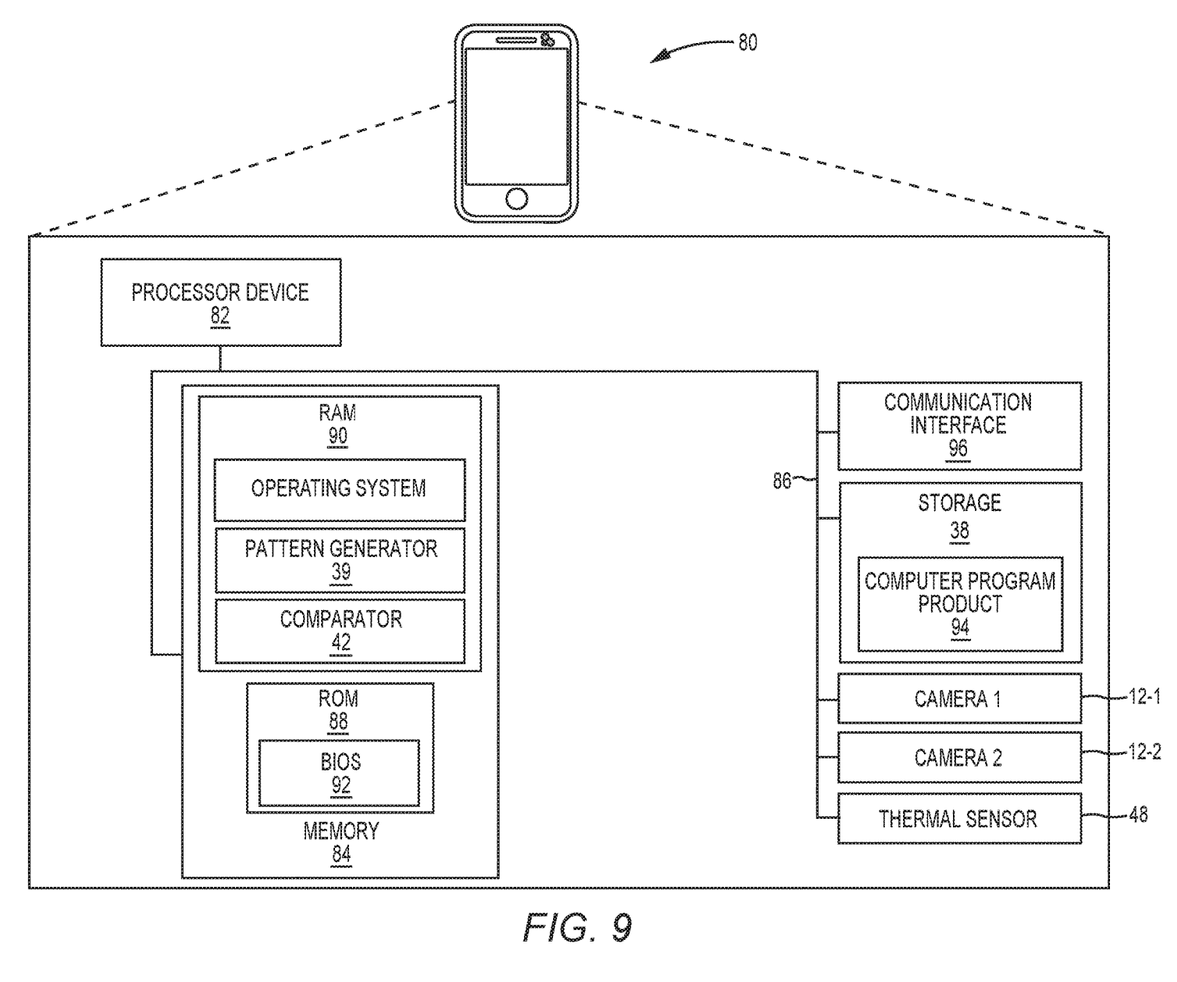
FIG. 9 is a block diagram of a computing device suitable for implementing aspects of the embodiments disclosed herein.

FIG. 9 is a block diagram of a computing device 80 suitable for implementing aspects of the embodiments disclosed herein. The computing device 80 is substantially similar to the computing devices 30, 54, except as otherwise discussed herein. The computing device 80 may comprise any computing or electronic device capable of including firmware, hardware, and/or executing software instructions to implement the functionality described herein, such as a desktop computing device, a laptop computing device, a smartphone, a computing tablet, or the like. The computing device 80 includes a processor device 82, memory 84, and a system bus 86. The system bus 86 provides an interface for system components including, but not limited to, the memory 84 and the processor device 82. The processor device 82 can be any commercially available or proprietary processor.

The system bus 86 may be any of several types of bus structures that may further interconnect to a memory bus (with or without a memory controller), a peripheral bus, and/or a local bus using any of a variety of commercially available bus architectures. The memory 84 may include non-volatile memory 88 (e.g., read-only memory (ROM), erasable programmable read-only memory (EPROM), electrically erasable programmable read-only memory (EEPROM), etc.), and volatile memory 90 (e.g., random-access memory (RAM)). A basic input/output system (BIOS) 92 may be stored in the non-volatile memory 88 and can include the basic routines that help to transfer information between elements within the computing device 80. The volatile memory 90 may also include a high-speed RAM, such as static RAM, for caching data.

The computing device 80 may further include or be coupled to a non-transitory computer-readable storage medium such as the storage device 38, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 38 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 38 and in the volatile memory 90, including an operating system and one or more program modules, such as the pattern generator 39 and the comparator 42, which may implement the functionality described herein in whole or in part.

All or a portion of the examples may be implemented as a computer program product 94 stored on a transitory or non-transitory computer-usable or computer-readable storage medium, such as the storage device 38, which includes complex programming instructions, such as complex computer-readable program code, to cause the processor device 82 to carry out the steps described herein. Thus, the computer-readable program code can comprise software instructions for implementing the functionality of the examples described herein when executed on the processor device 82. The processor device 82, in conjunction with the pattern generator 39 and the comparator 42, may serve as a controller, or control system, for the computing device 80 that is to implement the functionality described herein.

The user may also be able to enter one or more configuration commands through a keyboard (not illustrated), a pointing device such as a mouse (not illustrated), or a touch-sensitive surface such as the display device 36. Such input devices may be connected to the processor device 82 through an input device interface (not illustrated) that is coupled to the system bus 86 but can be connected by other interfaces such as a parallel port, an Institute of Electrical and Electronic Engineers (IEEE) 1394 serial port, a Universal Serial Bus (USB) port, an IR interface, and the like.

The computing device 80 may also include a communications interface 96 suitable for communicating with a network as appropriate or desired. The computing device 80 may include one or more cameras 12, and a thermal sensor 48.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by at least one sensor apparatus, polarized electromagnetic radiation (EMR) in a first waveband that has passed through a first polarizing filter and a second polarizing filter from an iris of an eye, and polarized EMR in a second waveband that has passed through the first polarizing filter and the second polarizing filter from the iris, the polarized EMR in the first waveband having a first polarization orientation and the polarized EMR in the second waveband having a second polarization orientation, the first polarizing filter being configured to pass the EMR in the first waveband that has the first polarization orientation and to pass the EMR in the second waveband irrespective of polarization orientation and the second polarizing filter being configured to pass the EMR in the second waveband that has the second polarization orientation and to pass the EMR in the first waveband irrespective of polarization orientation;
   generating, by a computing device, an iris pattern based on the polarized EMR in the first waveband and the polarized EMR in the second waveband;
   comparing the iris pattern to a reference iris pattern that was generated based on the iris; and
   generate a match signal or a mismatch signal based on comparing the iris pattern to the reference iris pattern.

2. The method of claim 1 further comprising detecting a blink of the eye.

3. The method of claim 1 further comprising detecting, via a thermal sensor, a human body.

4. The method of claim 1 wherein the first waveband comprises a first visible waveband and the second waveband comprises a second visible waveband.

5. The method of claim 1 wherein the first waveband comprises a visible waveband and the second waveband comprises a near-infrared waveband.

6. The method of claim 1 wherein the first polarization orientation is a linear polarization orientation that is 90 degrees offset from the second polarization orientation.

7. The method of claim 1 wherein the first polarization orientation is a first circular polarization orientation and the second polarization orientation is a second circular polarization orientation that is different from the first circular polarization orientation.

8. The method of claim 1 further comprising receiving, by the at least one sensor apparatus, polarized EMR in a third waveband from the iris, the polarized EMR in the third waveband having a third polarization orientation.

9. The method of claim 8 wherein the first polarization orientation is a linear polarization that is 60 degrees offset from the second polarization orientation and −60 degrees offset from the third polarization orientation.

10. The method of claim 8 wherein the first waveband comprises a first visible waveband, the second waveband comprises a second visible waveband, and the third waveband comprises a third visible waveband.

11. The method of claim 8 wherein the first waveband comprises a first visible waveband, the second waveband comprises a second visible waveband, and the third waveband comprises a near-infrared waveband.

12. The method of claim 8 wherein the first waveband comprises a first visible waveband, the second waveband comprises a near-infrared waveband, and the third waveband comprises a second near-infrared waveband.

13. The method of claim 8 wherein the first waveband comprises a first near-infrared waveband, the second waveband comprises a second near-infrared waveband, and the third waveband comprises a third near-infrared waveband.

14. A system comprising:
a first polarizing filter configured to pass electromagnetic radiation (EMR) in a first waveband that has a first polarization orientation and to pass EMR in a second waveband irrespective of polarization orientation;
a second polarizing filter configured to pass EMR in the second waveband that has a second polarization orientation and to pass EMR in the first waveband irrespective of polarization orientation;
at least one sensor apparatus configured to receive, by the at least one sensor apparatus, polarized EMR in the first waveband that has passed through the first polarizing filter and the second polarizing filter from an iris of an eye and polarized EMR in the second waveband that has passed through the first polarizing filter and the second polarizing filter from the iris, the polarized EMR in the first waveband having the first polarization orientation and the polarized EMR in the second waveband having the second polarization orientation; and
a processor device communicatively coupled to the at least one sensor apparatus, the processor device configured to:
generate an iris pattern based on the polarized EMR in the first waveband and the polarized EMR in the second waveband;
compare the iris pattern to a reference iris pattern generated based on the iris; and
generate a match signal or a mismatch signal based on comparing the iris pattern to the reference iris pattern.

15. The system of claim 14 wherein the at least one sensor apparatus comprises:
a first sensor configured to receive the polarized EMR in the first waveband and generate first sensor data based on the polarized EMR in the first waveband; and
a second sensor configured to receive the polarized EMR in the second waveband and generate second sensor data based on the polarized EMR in the second waveband.

16. The system of claim 14 wherein the first waveband comprises a first visible waveband, and the second waveband comprises a near-infrared waveband.

17. A computer program product stored on a non-transitory computer-readable storage medium and including instructions configured to cause a processor device to:
generate an iris pattern based on sensor data generated by at least one sensor apparatus in response to receiving polarized electromagnetic radiation (EMR) in a first waveband from an iris of an eye and polarized EMR in a second waveband from the iris, the polarized EMR in the first waveband having a first polarization orientation and the polarized EMR in the second waveband having a second polarization orientation, the polarized EMR in the first and second wavebands having passed through a first polarizing filter and a second polarizing filter, the first polarizing filter being configured to pass EMR in the first waveband that has the first polarization orientation and to pass EMR in the second waveband irrespective of polarization orientation, and the second polarizing filter being configured to pass EMR in the second waveband that has the second polarization orientation and to pass EMR in the first waveband irrespective of polarization orientation;
compare the iris pattern to a reference iris pattern generated based on the iris; and
generate a match signal or a mismatch signal based on comparing the iris pattern to the reference iris pattern.

* * * * *